US008607098B2

(12) United States Patent  (10) Patent No.: US 8,607,098 B2
Devegowda et al.  (45) Date of Patent: Dec. 10, 2013

(54) GENERATING APPROPRIATELY SIZED CORE FILES USED IN DIAGNOSING APPLICATION CRASHES

(75) Inventors: Amar Devegowda, Bangalore (IN); Douglas J. Griffith, Georgetown, TX (US); Venkataraghavan Lakshminarayanachar, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 13/116,179

(22) Filed: May 26, 2011

(65) Prior Publication Data

US 2012/0304015 A1    Nov. 29, 2012

(51) Int. Cl.
    *G06F 11/00* (2006.01)
(52) U.S. Cl.
    USPC ......................................... 714/38.1
(58) Field of Classification Search
    USPC ........... 714/37, 38.1, 38.11, 38.12, 38.13, 39, 714/42, 48
    See application file for complete search history.

(56) References Cited

U.S. PATENT DOCUMENTS

| 5,293,612 | A | 3/1994 | Shingai |
| 6,681,348 | B1* | 1/2004 | Vachon ........................... 714/45 |
| 7,062,677 | B1 | 6/2006 | Chigurupati |
| 7,149,929 | B2 | 12/2006 | Chaurasia |
| 7,243,338 | B2* | 7/2007 | Sethi et al. ..................... 717/128 |
| 7,363,615 | B2 | 4/2008 | Krishnaswamy et al. |
| 7,496,794 | B1* | 2/2009 | Eastham et al. ................ 714/37 |
| 7,698,598 | B1* | 4/2010 | Harris ............................. 714/37 |
| 7,707,462 | B1 | 4/2010 | Harris |
| 7,783,932 | B1 | 8/2010 | Eigen et al. |
| 2009/0024820 | A1* | 1/2009 | Ponnuswamy ............... 711/170 |
| 2009/0300424 | A1 | 12/2009 | Kojima |

FOREIGN PATENT DOCUMENTS

WO     2010018619 A1    2/2010

OTHER PUBLICATIONS

Sen, Saikat, "Windows Debuggers: Part 1: A WinDbg Tutorial," http://www.codeproject.com/KB/debug/windbg_part1.aspx#_Toc64133674, Mar. 22, 2004.

* cited by examiner

*Primary Examiner* — Nadeem Iqbal
(74) *Attorney, Agent, or Firm* — Robert A. Voigt, Jr.; Winstead, P.C.

(57) ABSTRACT

A method, system and computer program product for generating appropriately sized core files used in diagnosing application crashes. An instruction pointer corresponding to the instruction that led to the application crash is identified. Address ranges of the garbage collection module and the compiler module are obtained. A determination is made as to whether the address of the instruction pointer lies within any of these address ranges for each stack frame in a crash stack. If it does not, then read or write instructions executed prior to the instruction that led to the application crash are identified for each stack frame in the crash stack. If a value of a register involved in such read or write instructions is within the address range of the compiled code buffers and/or heap, then the compiled code buffers and/or heap need to be included in the core file; otherwise, they do not.

20 Claims, 4 Drawing Sheets

GENERATING APPROPRIATELY SIZED CORE FILES USED IN DIAGNOSING APPLICATION CRASHES

TECHNICAL FIELD

The present invention relates to diagnosing application crashes, and more particularly to generating appropriately sized core files used in diagnosing application crashes.

BACKGROUND

In certain operating systems, the applications (i.e., processes) run in their own address space and any attempt made by an application to access address space that does not belong to the application (i.e., a memory-address violation) results in abnormal termination of the application. Abnormal termination of an application may also result from an illegal instruction, a bus error, or a user-generated quit signal. Upon the abnormal termination of an application, a device within the kernel of the operating system causes process state information to be written or "dumped" to a local permanent storage device. The file that is written to the local permanent storage device is typically named "core" and is generally referred to as the "core file." The process of saving the core file to a local permanent storage device is often referred to as a "core dump" or a "crash dump."

The core file may include information that may be used to diagnose the cause of the application crash. In the context of a Java® runtime environment, the core file may include the processor registers (e.g., program counter, stack pointer), processor and operating system flags, a list of loaded modules (along with information regarding where they are loaded) from the application as well as memory management information, which may include the Java® heap and the native heap. A Java® heap refers to the area of memory which contains all of the objects created by an application running on a Java® virtual machine. A "native heap," as used herein, refers to the area of memory which contains the code compiled by a compiler (e.g., Just-in-Time (JIT) compiler). The source code of a Java® program is compiled into an intermediate language called "bytecode," which cannot run by itself. The bytecode is converted (interpreted) into machine code at runtime by a compiler, such as a JIT compiler. This native machine code may then be stored in the native heap.

The core file may be used to diagnose the cause of the application crash, especially in situations where the problem can be re-created only in the customer environment, where the crashes are due to object or memory corruption or when the interactive debugger cannot be used in the failing environment.

Due to the complexity in diagnosing the cause of an application crash, multiple core files may have to be collected. For example, a core file may have to be collected at every instance an application crashes in diagnosing corruption issues. In another example, a core file may have to be collected at various intervals of time when a memory leak occurs. A memory leak occurs when a program consumes memory but is unable to release it back to the operating system. If too many memory leaks occur, these memory leaks can usurp all of memory and bring everything to a halt or slow the processing considerably.

The difficulty in using these core files to analyze and diagnose application crashes is their considerable size. Core files may span anywhere from a few 100 megabytes to a few gigabytes. As a result, core files may be difficult to store or transfer to a diagnostics environment.

If unnecessary information (unnecessary in analyzing and diagnosing the application crash) in the core file could be filtered from the core file, then the core file could be more appropriately sized thereby enabling core files to be more easily stored or transferred to a diagnostic environment.

BRIEF SUMMARY

In one embodiment of the present invention, a method for generating an appropriately sized core file comprises obtaining an address range of compiled code buffers and/or a heap. The method further comprises identifying one or more read or write instructions prior to an instruction that led to an application crash. Additionally, the method comprises generating a record indicating whether the compiled code buffers and/or the heap need to be included in a core file in response to whether a value of a register involved in the one or more read or write instructions is within the address range of the compiled code buffers and/or the heap. In addition, the method comprises generating, by a processor, the core file in response to the record.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
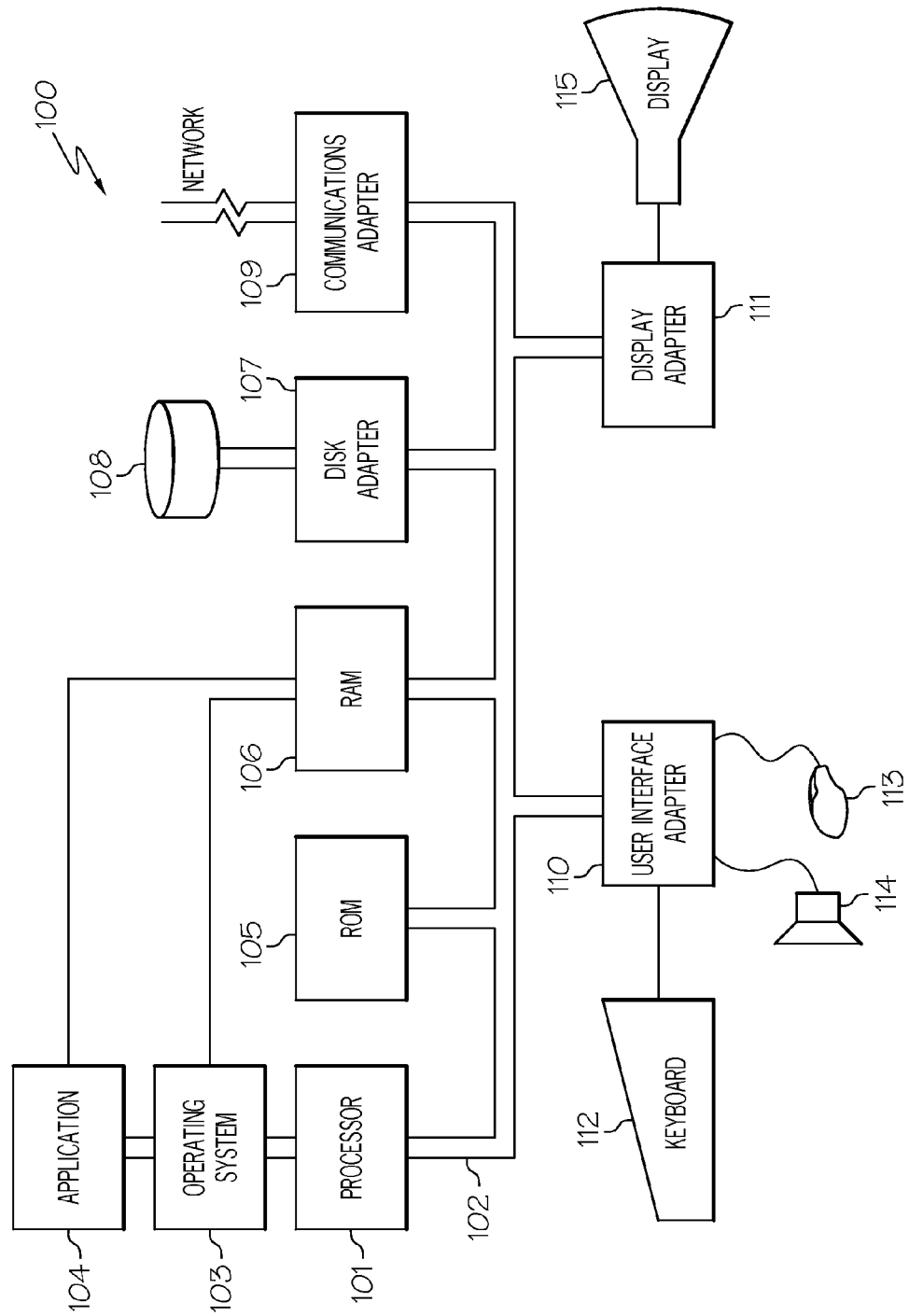
FIG. 1 is a hardware configuration of a data processing system in accordance with an embodiment of the present invention.

The present invention comprises a method, system and computer program product for generating appropriately sized core files used in diagnosing application crashes. In one embodiment of the present invention, an instruction pointer corresponding to the instruction that led to the application crash is identified. Address ranges of various chunks of memory, such as the address ranges of the garbage collection module, the compiler module, the compiled code buffers and the heap, are obtained. A determination is then made as to whether the address of the instruction pointer lies within the address range of the garbage collection module or the compiler module for each stack frame in a crash stack (functions that were being executed at the point of the crash are encapsulated within a stack, referred to herein as the "crash stack"). If so, then chunks of memory (e.g., compiled code buffers, heap) need to be included in the core file. Otherwise, one or more read or write instructions executed prior to the instruction that led to the application crash are identified for each stack frame in a crash stack to determine if the heap or compiled code buffers were accessed during the application crash. If a value of a register involved in such read or write instructions is within the address range of the compiled code buffers and/or heap, then the compiled code buffers and/or heap need to be included in the core file; otherwise, they do not. The information as to which chunks of memory, if any, need to be included in the core file is provided in a record which is sent to a module in the operating system to generate the appropriately sized core file. In this manner, chunks of memory that are not necessary in diagnosing an application crash may be excluded from the core file thereby generating a more appropriately sized core file which can be more easily stored or transferred to a diagnostic environment.

While the following discusses the present invention in connection with a Java® runtime environment, the principles of the present invention may be applied to any managed runtime environment, such as Microsoft's® Common Language Runtime (CLR) platform and Intel's® open runtime platform. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a hardware configuration of a computer system 100 which is representative of a hardware environment for practicing the present invention. Referring to FIG. 1, computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, an application for generating appropriately sized core files used in diagnosing application crashes as discussed further below in association with FIGS. 2 and 3A-3B.

Referring again to FIG. 1, read-only memory ("ROM") 105 is coupled to system bus 102 and includes a basic input/output system ("BIOS") that controls certain basic functions of computer device 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for generating appropriately sized core files used in diagnosing application crashes, as discussed further below in association with FIGS. 2 and 3A-3B, may reside in disk unit 108 or in application 104.

Computer system 100 may further include a communications adapter 109 coupled to bus 102. Communications adapter 109 interconnects bus 102 with an outside network thereby enabling computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the core file may be used to diagnose the cause of the application crash, especially in situations where the problem can be re-created only in the customer environment, where the crashes are due to object or memory corruption or when the interactive debugger cannot be used in the failing environment. Due to the complexity in diagnosing the cause of an application crash, multiple core files may have to be collected. For example, a core file may have to be collected at every instance an application crashes in diagnosing corruption issues. In another example, a core file may have to be collected at various intervals of time when a memory leak occurs. A memory leak occurs when a program consumes memory but is unable to release it back to the operating system. If too many memory leaks occur, these memory leaks can usurp all of memory and bring everything to a halt or slow the processing considerably. The difficulty in using these core files to analyze and diagnose application crashes is their considerable size. Core files may span anywhere from a few 100 megabytes to a few gigabytes. As a result, core files may be difficult to store or transfer to a diagnostics environment. If unnecessary information (unnecessary in analyzing and diagnosing the application crash) in the core file could be filtered from the core file, then the core file could be more appropriately sized thereby enabling core files to be more easily stored or transferred to a diagnostic environment.

Figure 2:
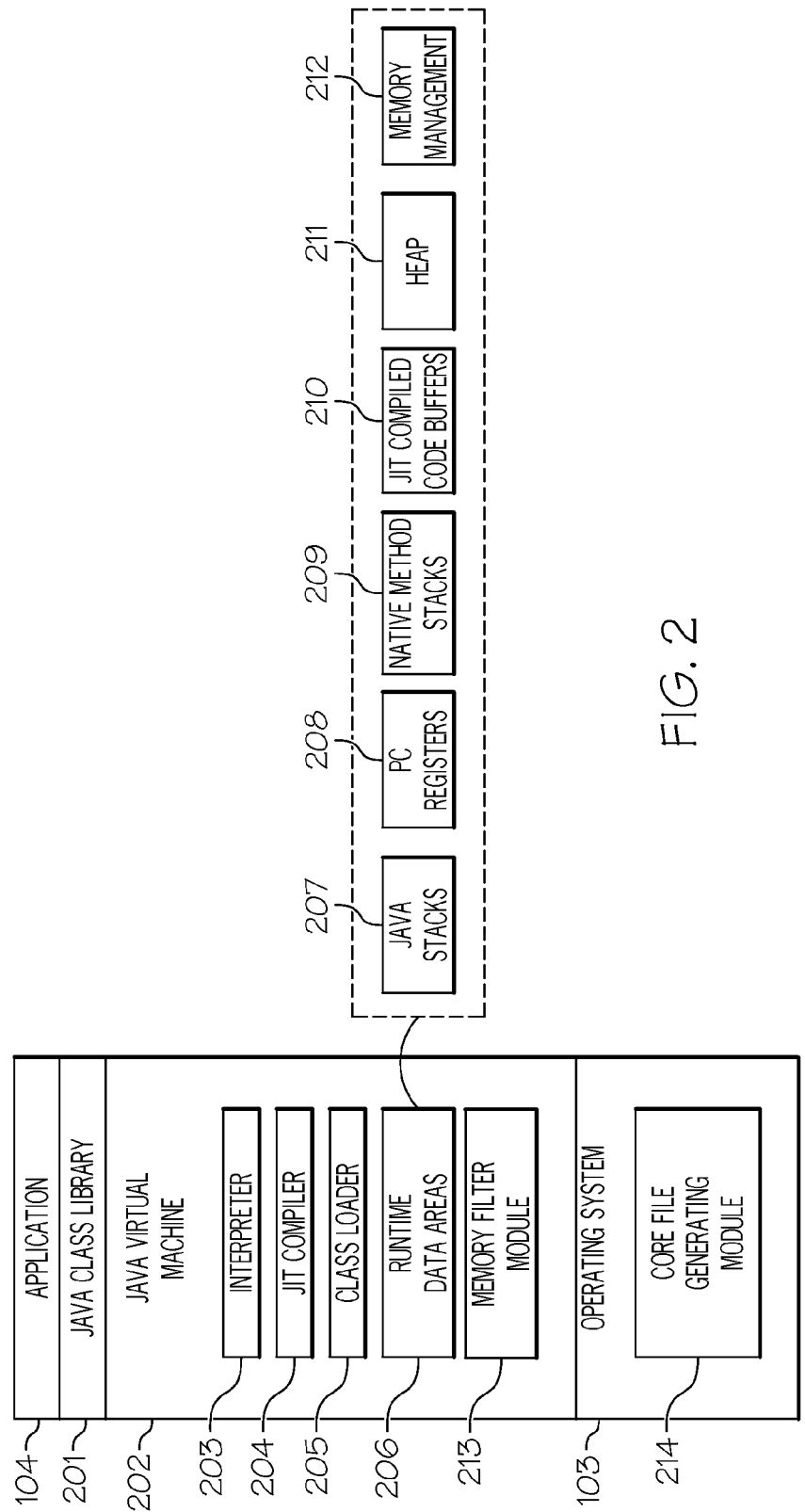
FIG. 2 illustrates the software components used in generating appropriately sized core files used in diagnosing application crashes.
Figure 3A:
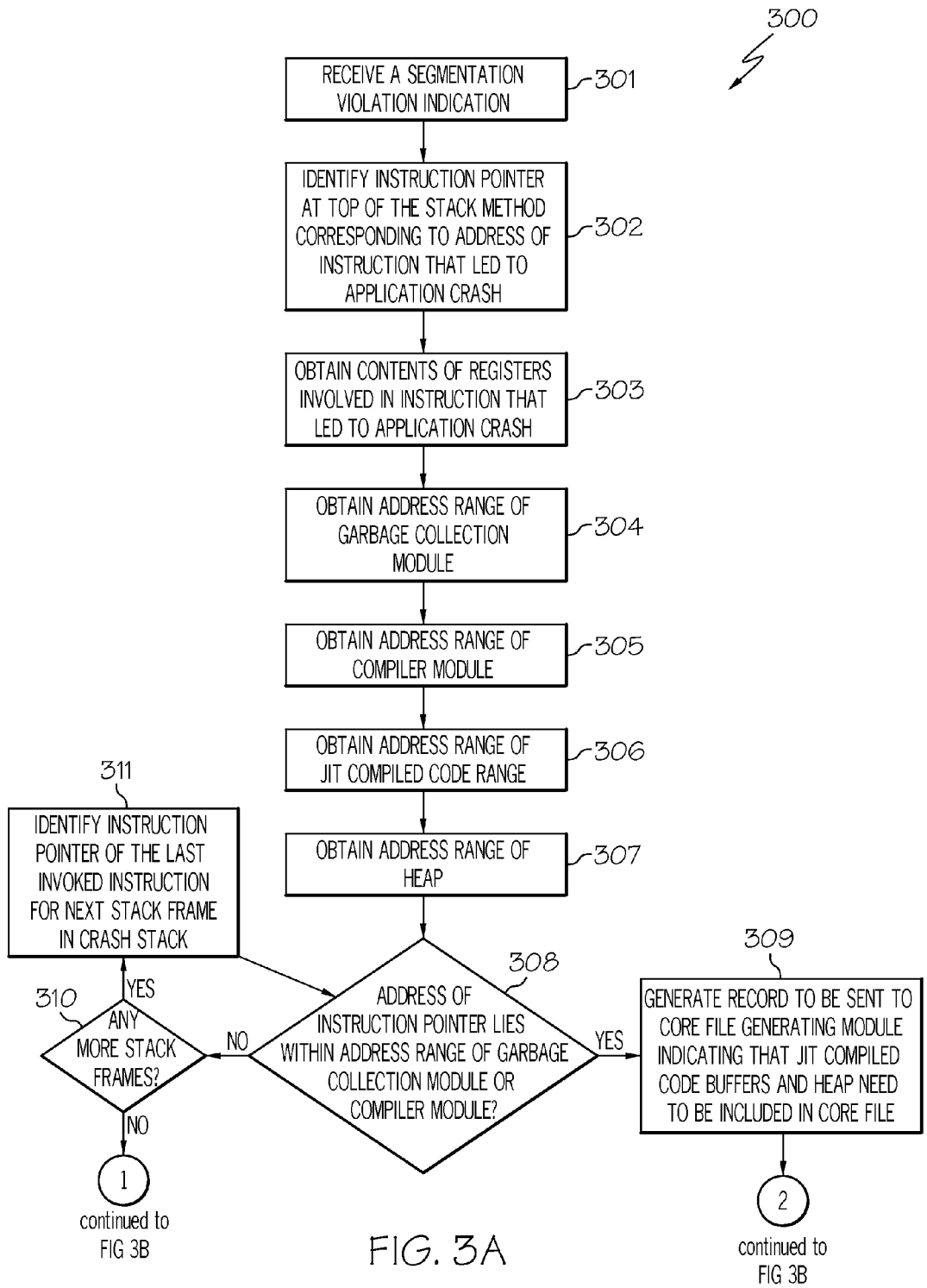
FIGS. 3A-3B are a flowchart of a method for generating appropriately sized core files used in diagnosing application crashes in accordance with an embodiment of the present invention
Figure 3B:
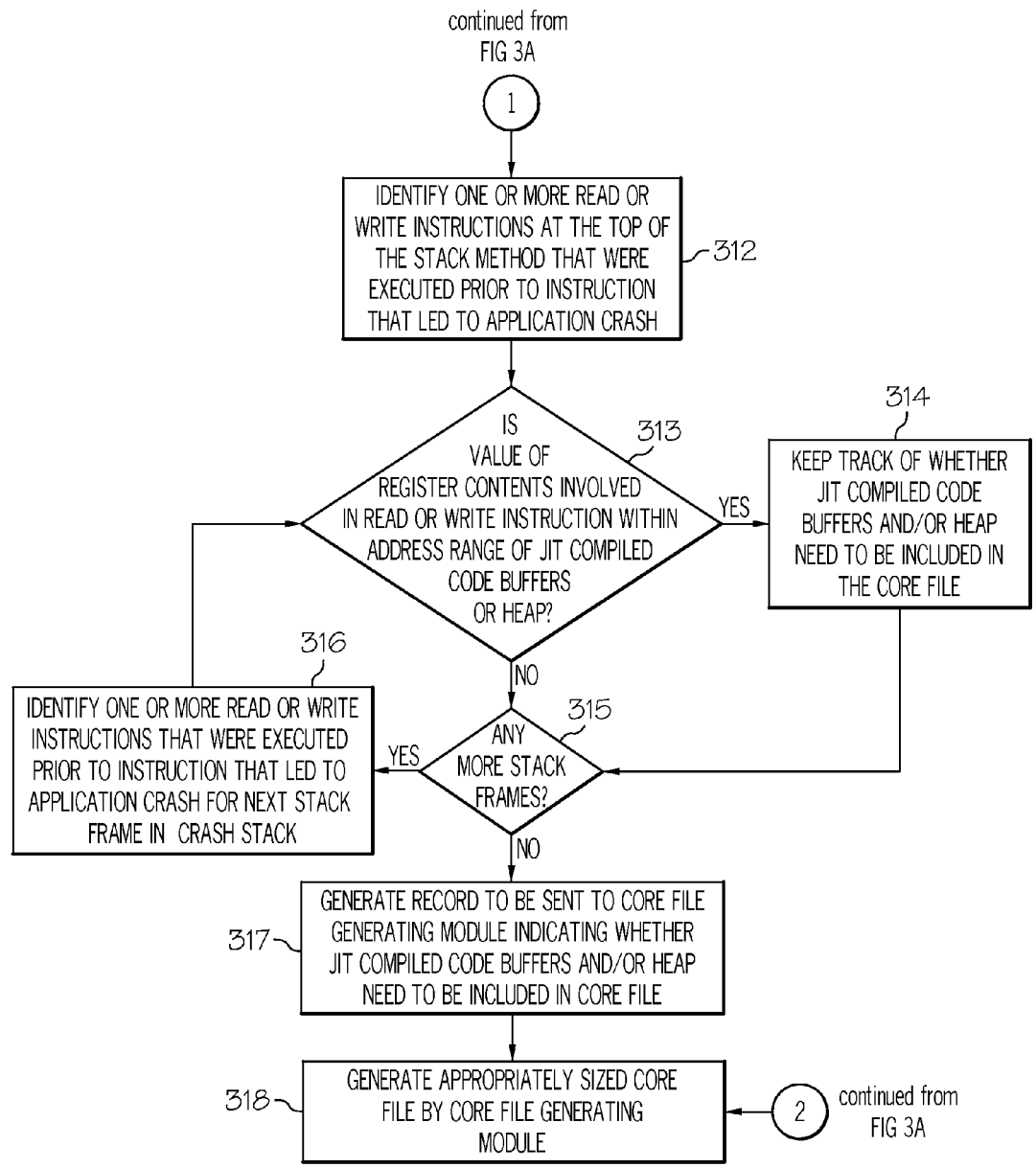

The principles of the present invention provide a means for generating appropriately sized core files that can be more easily stored or transferred to a diagnostic environment by not including chunks of memory (e.g., heap, compiled code buffers) in the core file when they are not necessary or pertinent for diagnosing the cause of an application crash as discussed below in connection with FIGS. 2 and 3A-3B. FIG. 2 is a stack model of the software components used in generating appropriately sized core files used in diagnosing application crashes. FIGS. 3A-3B are a flowchart of a method for generating appropriately sized core files used in diagnosing application crashes.

As stated above, FIG. 2 is a stack model of the software components used in generating appropriately sized core files used in diagnosing application crashes in accordance with an embodiment of the present invention.

Referring to FIG. 2, in conjunction with FIG. 1, application 104 (e.g., Java® application) can call at runtime a Java® class library 201, which is a set of dynamically loadable libraries. Java® class library 201 runs on a virtual machine 202, such as a Java® Virtual Machine ("JVM"). JVM 202 is one software application that may execute in conjunction with operating system 103. JVM 202 provides a Java® run-time environment with the ability to execute a Java® application or applet, which is a program, servlet, or software component written in the Java® programming language.

JVM 202 is a virtual computer component that executes Java® programs 104. Java® programs 104 are not run directly by the central processor (e.g., processor 101 of FIG. 1) but instead by JVM 202, which is itself a piece of software running on the processor. JVM 202 allows Java® programs to be executed on different platforms, as opposed to only the one platform for which the code was compiled. Java® programs are compiled for JVM 202. In this manner, Java® is able to support applications for many types of data processing systems, which may contain a variety of central processing units and operating system architectures. To enable a Java® application to execute on different types of data processing systems, a compiler typically generates an architecture-neutral file format (i.e., the compiled code is executable on many processors, given the presence of the Java® run-time system). The Java® compiler generates bytecode instructions that are nonspecific to a particular computer architecture. A bytecode is a machine independent code generated by the Java® compiler and executed by a Java® interpreter 203. Java® interpreter 203 is part of JVM 202 that alternately decodes and interprets a bytecode or bytecodes. These bytecode instructions are designed to be easy to interpret on any computer and easily translated on the fly into native machine code. Bytecodes may be translated into native code by a Just-In-Time (JIT) compiler 204.

JVM 202 loads class files and executes the bytecodes within them. JVM 202 contains a class loader 205, which loads class files from an application and the class files from the Java® application programming interfaces (APIs) which are needed by the application.

One type of software-based execution engine is JIT compiler 204. With this type of execution, the bytecodes of a method are compiled to native machine code upon successful fulfillment of some type of criteria for just-in-time compiling a method. The native machine code for the method is then cached in what is referred to herein as "JIT compiled code buffers," (discussed further below) and reused upon the next invocation of the method.

Interpreting code provides an additional benefit. Rather than instrumenting the Java® source code, interpreter 203 may be instrumented. Trace data may be generated via selected events and timers through the instrumented interpreter 203 without modifying the source code.

When an application 104 is executed on JVM 202, a Java® application may interact with the host operating system 103 by involving native methods. A Java® method is written in the Java® language, compiled to bytecodes, and stored in class files. A native method is written in some other language and compiled to the native machine code of a particular processor. Native methods are stored in a dynamically linked library whose exact form is platform specific.

Referring again to FIG. 2, JVM 202 further includes runtime data areas 206. Runtime data areas 206 contain Java® stacks 207, Program Counter (PC) registers 208, native method stacks 209, JIT compiled code buffers 210, a Java® heap 211 and memory management 212. These different data areas represent the organization of memory needed by JVM 202 to execute a program.

Java® stacks 207 are used to store the state of Java® method invocations. When a new thread is launched, JVM 202 creates a new Java® stack for the thread. JVM 202 performs only two operations directly on Java stacks 207: it pushes and pops frames. A thread's Java® stack stores the state of Java® method invocations for the thread. The state of a Java® method invocation includes its local variables, the parameters with which it was invoked, its return value, if any, and intermediate calculations. Java® stacks are composed of stack frames. A stack frame contains the state of a single Java® method invocation. When a thread invokes a method, JVM 202 pushes a new frame onto the Java® stack of the thread. When the method completes, JVM 202 pops the frame for that method and discards it. JVM 202 does not have any registers for holding intermediate values; any Java® instruction that requires or produces an intermediate value uses the stack for holding the intermediate values. In this manner, the Java® instruction set is well defined for a variety of platform architectures.

PC registers 208 are used to indicate the next instruction to be executed. Each instantiated thread gets its own PC register (program counter) and Java® stack. If the thread is executing a JVM method, the value of the PC register indicates the next instruction to execute. If the thread is executing a native method, then the contents of the PC register are undefined.

Native method stacks 209 store the state of invocations of native methods. The state of native method invocations is stored in an implementation-dependent way in native method stacks, registers, or other implementation-dependent memory areas. In some JVM implementations, native method stacks 209 and Java® stacks 207 are combined.

As discussed above, bytecodes of a method are compiled to native machine code upon successful fulfillment of some type of criteria for just-in-time compiling a method. The native machine code for the method is then cached in JIT compiled code buffers 210.

Java® heap 211 contains all instantiated objects. Each time a class instance or array is created, the memory for the new object is allocated from heap 211. JVM 202 includes an instruction that allocates memory space within the memory for heap 211 but includes no instruction for freeing that space within the memory. Memory management 212 in the depicted example manages memory space within the memory allocated to heap 211. Memory management 212 may include a "garbage collector," which automatically reclaims memory used by objects that are no longer referenced. Additionally, a garbage collector also may move objects to reduce heap fragmentation.

Additionally, JVM 202 includes what is referred to herein as the "memory filter module" 213, which is configured to determine if chunks of memory, such as heap 211 and JIT compiled code buffers 210, are not needed to be included in the core file for diagnosing the cause of an application crash thereby minimizing the size of the core file so as to make the core file more easily stored or transferred to a diagnostic environment. A more detail description of the functionality of memory filter module 213 is discussed below in connection with FIGS. 3A-3B.

The software components further include a component referred to herein as the "core file generating module" 214 within operating system 103. Core file generating module 214 is configured to receive a record from memory filter module 213 that includes an indication as to whether the core file needs to include chunks of memory, such as heap 211 and JIT compiled code buffers 210. Upon receipt of this record, core file generating module 214 generates an appropriately sized core file. A more detail description of the functionality of core file generating module 214 is discussed below in connection with FIGS. 3A-3B.

As stated above, FIGS. 3A-3B are a flowchart of a method 300 for generating appropriately sized core files used in diagnosing application crashes in accordance with an embodiment of the present invention.

Referring to FIG. 3A, in conjunction with FIGS. 1-2, in step 301, memory filter module 213 receives a segmentation violation indication. In one embodiment, the Java® runtime environment installs a handler to handle the segmentation violation. An application crash may generate a segmentation violation which occurs when a program attempts to access a memory location that is not allowed to access or attempts to access a memory location in a way that is not allowed. When the crash occurs, typically a thread within the application is executing a set of method calls. The executing thread which led to the crash is referred to herein as the "crash thread." The functions that were being executed by the crash thread at the point of the crash are encapsulated within a stack, referred to herein as the "crash stack." The crash stack includes multiple stack frames, where each stack frame represents an individual method call that invokes a method above it and is invoked by the method below it. Each stack frame includes instructions which are used for the actual execution.

In step 302, memory filter module 213 identifies the instruction pointer at the top of the stack method (method at the top of the crash stack) corresponding to the address of the instruction that led to the application crash.

In step 303, memory filter module 213 obtains the contents of the registers involved in the instruction that led to the application crash.

In step 304, memory filter module 213 obtains the address range of the garbage collection module, which refers to the module for controlling the runtime garbage collector.

In step 305, memory filter module 213 obtains the address range of the compiler module of JVM 202. The compiler module refers to the module for controlling the JIT compiler 204.

In step 306, memory filter module 213 obtains the address range of the JIT compiled code range, referring to the address range of the JIT compiled code buffers 210.

In step 307, memory filter module 213 obtains the address range of heap 211.

In step 308, memory filter module 213 determines if the address of the instruction pointer lies within the address range of the garbage collection module (obtained in step 304) or of the compiler module of JVM 202 (obtained in step 305).

If the address of the instruction pointer lies within either the address range of the garbage collection module or the compiler module of JVM 202, then, in step 309, memory filter module 213 generates a record to be sent to core file generating module 214 indicating that JIT compiled code buffers 210 and heap 211 need to be included the core file.

If, however, the address of the instruction pointer does not lie within the address range of the garbage collection module or of the compiler module of JVM 202, then, in step 310, a determination is made by memory filter module 213 as to whether there are any more stack frames within the crash stack to be evaluated. If so, then, in step 311, memory filter module 213 identifies the instruction pointer of the last invoked instruction for the next stack frame in the crash stack.

Upon identifying the instruction pointer of the last invoked instruction for the next stack frame in the crash stack, memory filter module 213 determines if the address of this instruction pointer lies within the address range of the garbage collection module (obtained in step 304) or of the compiler module of JVM 202 (obtained in step 305) in step 308.

If, however, there are no more stack frames of the crash stack to be evaluated, then, referring to FIG. 3B, in conjunction with FIGS. 1 and 2, in step 312, memory filter module 213 identifies one or more read or write executed instructions at the top of the stack method that were executed prior to the instruction that led to the application crash to be analyzed in connection with the address ranges of JIT compiled code 210 and heap 211. In this manner, a determination can be made as to whether the contents of any of the registers that are being used by these instructions are in the JIT compiled code buffers 210 or in heap 211. If so, then JIT compiled code buffers 210 and/or heap 211 need to be retained in the core file. Otherwise, JIT compiled code buffers 210 and heap 211 do not need to be included in the core file.

In one embodiment, Java® stacks 207 is a call stack where the caller pushes the return address onto the stack and the called subroutine, when it finishes, pops the return address off the call stack and transfers control to that address. If a called subroutine calls on to yet another subroutine, it will push another return address onto the call stack, and so on, with the information stacking up and unstacking as the program dictates. Adding a subroutine's entry to the call stack is referred to as "winding;" conversely, removing entries is referred to as "unwinding."

As a result, every unwinding may be tracked where each read and write operation in connection with the unwinding is analyzed against the address range of JIT compiled code buffers 210 and heap 211 to determine if JIT compiled code buffers 210 and/or heap 211 need to be included in the core file. Any number of frames (a stack frame contains the state of a single Java® method invocation) may be unwound where each read and write operation in connection with the unwinding is analyzed against the address ranges of JIT compiled code buffers 210 and heap 211 to determine if JIT compiled code buffers 210 and/or heap 211 were accessed during the context in which the application crash occurred thereby determining if JIT compiled code buffers 210 and/or heap 211 need to be included in the core file.

If the value(s) of the register contents involved in the read or write instruction(s) that are identified in step 312 are not within the address range of JIT compiled code buffers 210 or heap 211, then JIT compiled code buffers 210 and heap 211 do not need to be included in the core file. Otherwise, if the value(s) of the contents involved in the read or write instruction(s) that are identified in step 312 are within the address range of JIT compiled code buffers 210, then the JIT compiled code buffers 210 need to be included in the core file. Furthermore, if the value(s) of the contents involved in the read or write instruction(s) that are identified in step 312 are within the address range of heap 211, then heap 211 needs to be included in the core file.

For example, a sample trace from Java stacks 207 showing the instructions that led up to the instruction causing the application crash is shown as follows:

```
Register Contents
RDI: 0000003C3072E8C0
RBX: FFFFFFFFBD0008F0
(gdb) x/20i 0x0000002abd10cd00
0x2abd10cd00 <NET_IsBlocked>: push %rbp
0x2abd10cd01 <NET_IsBlocked+1>: mov %rsp,%rbp << STACK
WRITE : No Need to Track! Move stack pointer to base pointer
0x2abd10cd04 <NET_IsBlocked+4> : push %rbx
0x2abd10cd05 <NET_IsBlocked+5> : mov %rdi,%rbx << DATA
WRITE : Move the contents of rdi to rbx
RDI at this point has the value 0000003C3072E8C0 which is not in the
Java Heap Range (2a9a530000 -2aaa530000) and not in the Java Compiled
Code Range (2abb3e4000 - 2abbde4000)
0x2abd10cd08 <NET_IsBlocked+8>: lea 22208(%rip),%rdi #
0x2abd1123cf
<opts.0+1199>
0x2abd10cd0f <NET_IsBlocked+15>: sub $0x8,%rsp << Updating Stack
pointer
0x2abd10cd13 <NET_IsBlocked+19>: callq 0x2abd1043a8
<NET_Bind@plt+144> << Calling Net_Bind function
0x2abd10cd18 <NET_IsBlocked+24>: test %rbx,%rbx << Testing the
value of RBX, which points to an inaccessible address
0x2abd10cd1b <NET_IsBlocked+27>: je 0x2abd10cd23
<NET_IsBlocked+35>
0x2abd10cd1d <NET_IsBlocked+29>: cmpl $0x2,0x8(%rbx) << Crashes
here
```

As illustrated, the instruction "0x2abd10cd05<NET_IsBlocked+5>: mov % rdi,% rbx" is a write instruction where the contents of register RDI is not within the address range of heap 211 (2a9a530000-2aaa530000). Neither are the contents of register RDI within the address range of the JIT compiled code buffers (2abb3e4000-2abbde4000). This instruction occurs prior to the instruction "0x2abd10cd1d <NET_IsBlocked+29>: cmpl $0x2,0x8(% rbx)" where the crash occurred.

In step 313, memory filter module 212 determines if the value(s) of the register contents involved in the read or write instruction(s) are within the address range of either JIT compiled code buffers 210 or heap 211. If the value(s) of the register contents involved in the read or write instruction(s) that are identified in step 312 are within either the address range of JIT compiled code buffers 210 and/or heap 211, then, in step 314, memory filter module 213 keeps track of whether JIT compiled code buffers 210 and/or heap 211 need to be included in the core file. For example, if the value(s) of the register contents involved in the read or write instruction(s) that are identified in step 312 are within the address range of JIT compiled code buffers 210, then JIT compiled code buffers 210 need to be included in the core file. If the value(s) of the register contents involved in the read or write instruction (s) that are identified in step 312 are within the address range of heap 211, then heap 211 needs to be included in the core file.

Upon executing step 314, or if the value(s) of the register contents involved in the read or write instruction(s) that are identified in step 312 are not within the address range of JIT compiled code buffers 210 or heap 211, then, in step 315, a determination is made by memory filter module 213 as to whether there are any more stack frames within the crash stack to be evaluated. If so, then, in step 316, memory filter module 213 identifies one or more read or write instructions that were executed prior to the instruction that led to the application crash for the next stack frame in the crash stack.

Upon identifying the one or more read or write instructions that were executed prior to the instruction that led to the application crash for the next stack frame in the crash stack, memory filter module 213 determines if the value(s) of the register contents involved in the read or write instruction(s) are within the address range of either JIT compiled code buffers 210 or heap 211 in step 313.

If, however, there are no more stack frames of the crash stack to be evaluated, then, in step 317, memory filter module 213 generates a record to be sent to core file generating module 214 indicating whether JIT compiled code buffers 210 and/or heap 211 need to be included in the core file.

Upon memory filter module 213 providing the information to core file generating module 214 as discussed above in steps 309 and 317, core file generating module 214, in step 318, generates the appropriately sized core file based on the received information from memory filter module 213. Such information may allow core file generating module 214 to not include chunks of memory, such as heap 211 and JIT compiled code buffers 210, that are not needed to be included in the core file for diagnosing the cause of an application crash thereby minimizing the size of the core file so as to make the core file more easily stored or transferred to a diagnostic environment.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for generating an appropriately sized core file, the method comprising:
    obtaining an address range of one or more of compiled code buffers and a heap;
    identifying one or more read or write instructions prior to an instruction that led to an application crash;
    generating a record indicating whether one or more of said compiled code buffers and said heap need to be included in a core file in response to whether a value of a register involved in said one or more read or write instructions is within said address range of one or more of said compiled code buffers and said heap; and
    generating, by a processor, said core file in response to said record.

2. The method as recited in claim 1 further comprising:
    identifying an instruction pointer corresponding to an address of said instruction that led to said application crash.

3. The method as recited in claim 2 further comprising:
    obtaining an address range of one or more of a garbage collection module and a compiler module.

4. The method as recited in claim 3 further comprising:
    determining if an address of said instruction pointer lies within said address range of one or more of said garbage collection module and said compiler module.

5. The method as recited in claim 4 further comprising:
    generating said record indicating whether said compiled code buffers and said heap need to be included in said core file in response to whether said address of said instruction pointer lies within said address range of one or more of said garbage collection module and said compiler module.

6. The method as recited in claim 5, wherein said record indicates that said compiled code buffers and said heap are not needed to be included in said core file in response to said address of said identified instruction pointer not lying within said address range of said garbage collection module and said compiler module for each stack frame in a crash stack and in response to said value of said register involved in said one or more read or write instructions not lying within said address range of said compiled code buffers and said heap for each stack frame in a crash stack.

7. The method as recited in claim 1 further comprising:
    receiving a segmentation violation in response to said application crash.

8. A computer program product embodied in a non-transitory computer-readable storage medium for generating an appropriately sized core file, the computer program product comprising the programming instructions for:
    obtaining an address range of one or more of compiled code buffers and a heap;
    identifying one or more read or write instructions prior to an instruction that led to an application crash;
    generating a record indicating whether one or more of said compiled code buffers and said heap need to be included in a core file in response to whether a value of a register involved in said one or more read or write instructions is within said address range of one or more of said compiled code buffers and said heap; and
    generating said core file in response to said record.

9. The computer program product as recited in claim 8 further comprising the programming instructions for:
    identifying an instruction pointer corresponding to an address of said instruction that led to said application crash.

10. The computer program product as recited in claim 9 further comprising the programming instructions for:
    obtaining an address range of one or more of a garbage collection module and a compiler module.

11. The computer program product as recited in claim 10 further comprising the programming instructions for:
    determining if an address of said instruction pointer lies within said address range of one or more of said garbage collection module and said compiler module.

12. The computer program product as recited in claim 11 further comprising the programming instructions for:
    generating said record indicating whether said compiled code buffers and said heap need to be included in said core file in response to whether said address of said instruction pointer lies within said address range of one or more of said garbage collection module and said compiler module.

13. The computer program product as recited in claim 12, wherein said record indicates that said compiled code buffers and said heap are not needed to be included in said core file in response to said address of said identified instruction pointer not lying within said address range of said garbage collection module and said compiler module for each stack frame in a crash stack and in response to said value of said register involved in said one or more read or write instructions not lying within said address range of said compiled code buffers and said heap for each stack frame in a crash stack.

14. The computer program product as recited in claim 8 further comprising the programming instructions for:
   receiving a segmentation violation in response to said application crash.

15. A system, comprising:
   a memory unit for storing a computer program for generating an appropriately sized core file; and
   a processor coupled to said memory unit, wherein said processor, responsive to said computer program, comprises
      circuitry for obtaining an address range of one or more of compiled code buffers and a heap;
      circuitry for identifying one or more read or write instructions prior to an instruction that led to an application crash;
      circuitry for generating a record indicating whether one or more of said compiled code buffers and said heap need to be included in a core file in response to whether a value of a register involved in said one or more read or write instructions is within said address range of one or more of said compiled code buffers and said heap; and
      circuitry for generating said core file in response to said record.

16. The system as recited in claim 15, wherein said processor further comprises:
   circuitry for identifying an instruction pointer corresponding to an address of said instruction that led to said application crash.

17. The system as recited in claim 16, wherein said processor further comprises:
   circuitry for obtaining an address range of one or more of a garbage collection module and a compiler module.

18. The system as recited in claim 17, wherein said processor further comprises:
   circuitry for determining if an address of said instruction pointer lies within said address range of one or more of said garbage collection module and said compiler module.

19. The system as recited in claim 18, wherein said processor further comprises:
   circuitry for generating said record indicating whether said compiled code buffers and said heap need to be included in said core file in response to whether said address of said instruction pointer lies within said address range of one or more of said garbage collection module and said compiler module.

20. The system as recited in claim 19, wherein said record indicates that said compiled code buffers and said heap are not needed to be included in said core file in response to said address of said identified instruction pointer not lying within said address range of said garbage collection module and said compiler module for each stack frame in a crash stack and in response to said value of said register involved in said one or more read or write instructions not lying within said address range of said compiled code buffers and said heap for each stack frame in a crash stack.

* * * * *